(12) United States Patent
Bolotnikov

(10) Patent No.: US 7,564,963 B2
(45) Date of Patent: Jul. 21, 2009

(54) MULTI-HANDSET TELEPHONE SYSTEM

(75) Inventor: Andrey A. Bolotnikov, Pacific Grove, CA (US)

(73) Assignee: Language Line Services, Inc., Monterey, CA (US)

( * ) Notice: Subject to any disclaimer, the term of this patent is extended or adjusted under 35 U.S.C. 154(b) by 620 days.

(21) Appl. No.: 10/818,690

(22) Filed: Apr. 5, 2004

(65) Prior Publication Data

US 2005/0226404 A1 Oct. 13, 2005

(51) Int. Cl.
*H04M 1/00* (2006.01)
*H04M 9/00* (2006.01)
(52) U.S. Cl. ...................................... 379/395; 379/455
(58) Field of Classification Search ................ 379/395, 379/428.01, 442, 455
See application file for complete search history.

(56) References Cited

U.S. PATENT DOCUMENTS 4,362,905 A * 12/1982 Ismail ........................ 379/442
5,604,798 A * 2/1997 Sacchetti et al. ....... 379/390.03
5,784,456 A * 7/1998 Carey et al. .................. 379/419
6,671,371 B1 * 12/2003 McNeill et al. ......... 379/387.01

\* cited by examiner

*Primary Examiner*—Alexander Jamal
(74) *Attorney, Agent, or Firm*—Patent Ingenuity, P.C.; Samuel K. Simpson

(57) ABSTRACT

A multi-handset telephone system includes is a first-base that includes circuitry for communicating with an external telephone line, a ringer for signaling when an incoming call is received, and a cradle for holding a single handset, a first handset, and a handset connection port. A second base has a cradle and a second handset. The interconnection is a flexible hardwired connection, and there is a switch associated with the second base. A port communicates the signal from the incoming call, and an outlet splits the telephone signal from the line into a plurality of handset cords. A first handset is connected with a first handset cord and a second handset is connected with a second handset cord of the plurality of handset cords. The corresponding plurality of handset cords permits a plurality of users in close proximity to speak on the plurality of handsets in a face-to-face situation with a third party. The telephone system is a digital and the second base does not have a ringer. Persons to speak different languages to communicate face-to-face through use of remote interpretation services.

8 Claims, 4 Drawing Sheets

MULTI-HANDSET TELEPHONE SYSTEM

BACKGROUND

This invention relates to multi-handset telephone systems. In particular the system and method of the telephone system is such as to permit at least two users of the phone to converse face-to face with a third-party. More particularly the invention is concerned with permitting persons who speak different languages to communicate face-to-face through use of remote interpretation services with the use of the multi-handset telephone system.

Systems for permitting this face-to-face communication with a phone are known but they suffer from various disadvantages in that they are not as user friendly as possible and in that they do not function as needed with digital phone systems. For instance, digital PBXs (switches) are produced by several competing companies, and they have proprietary characteristics, which generally prevent different digital phone models from universally working with other digital phone models.

The invention is directed to minimizing the prior art disadvantages.

SUMMARY

According to one aspect there is provided a multi-handset telephone system that permits at least two users to converse face-to face with a third-party.

There is a first-base, which includes circuitry for communicating with an external telephone line. There is a ringer for signaling when an incoming call is received by the first unit. A cradle for the first unit holds a single handset, and there is a first handset, and a handset connection port with the base. There is also a port through which the signal from the incoming call is communicated to the first unit.

There is also a second base with a cradle and a second handset. The second base is non-rigidly physically interconnected to the first base and is also electrically connected with the first base. The non-rigid interconnection is preferably a flexible hardwired connection. The interconnection is effected through the normal outlet to a handset of the first base.

A first handset is connected with a first handset cord and a second handset is connected with a second handset cord of the plurality of handset cords. Both handset cords are connected to the second base unit. The corresponding plurality of handset cords permits a plurality of users in close proximity to speak on the plurality of handsets in a face-to-face situation with a third party. An outlet from the second base splits the telephone signal from the line into the plurality of handset cords.

The telephone system is a digital phone system, and preferably the second base does not have a ringer. There are one or more switches associated with the telephones. The connection between the phone units is effected from the outlet in the first base which is the normal outlet to a handset.

There is provided a method of permitting persons to speak different languages to communicate face-to-face through use of remote interpretation services. The method comprises providing a multi-handset telephone system for permitting at least two users to converse face-to face with a third-party. A first-base includes circuitry for communicating with an external telephone line, a ringer for signaling when an incoming call is received, and a cradle for holding a single handset, a first handset, and a handset connection port. A second base has a cradle and a second handset, and the second base is non-rigidly physically and electrically interconnected to the first base.

There is a port for communicating the signal from the incoming call to the circuit in the first base unit. This is communicated to the circuitry in the second base unit. An outlet from the second base unit. There is a split in the telephone signal from the input line into a plurality of handset cords. A first handset is connected with a first handset cord which is connected to the second base unit. A second handset is connected with a second handset cord which is also connected to the second base unit. The respective first and second bases, their electrical connection and their non-rigid physical interconnection, and the corresponding plurality of handset cords permits a plurality of users in close proximity to speak on the plurality of handsets in a face-to-face situation.

The invention is now further described with reference to the accompanying drawings.

DETAILED DESCRIPTION

Figure 1:
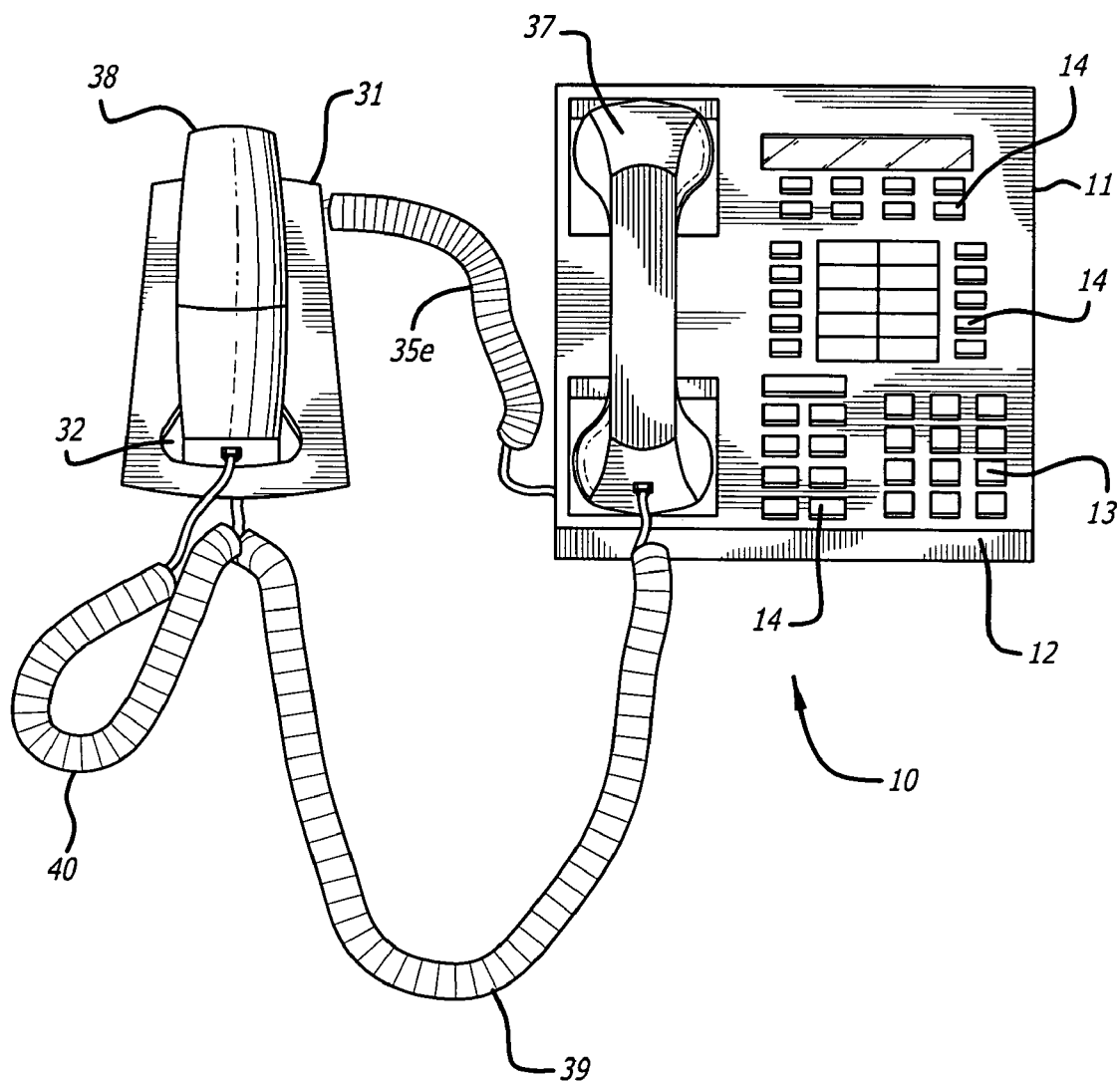
FIG. 1 is a perspective view from the top of a telephone system in accordance with the invention.
Figure 2:
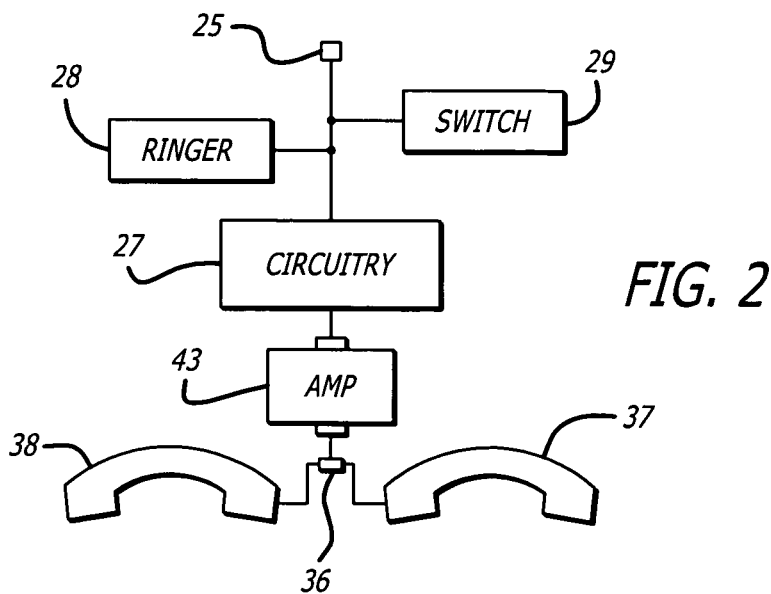
FIG. 2 is a detailed view of the connections between the multi handset system in accordance with the invention.
Figure 3:
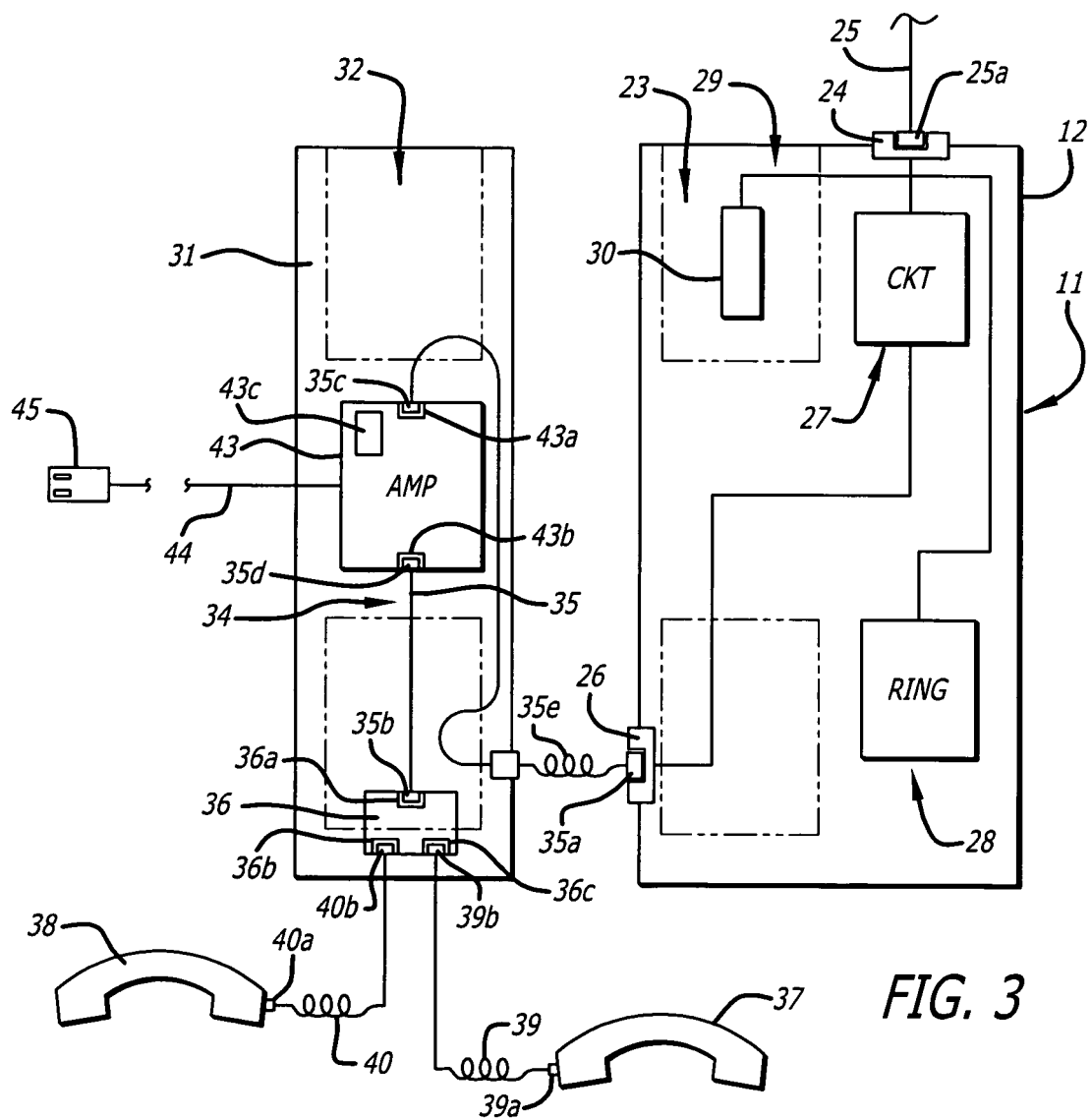
FIG. 3 is a view of the circuitry associated with the phone system of the Invention.
Figure 4:
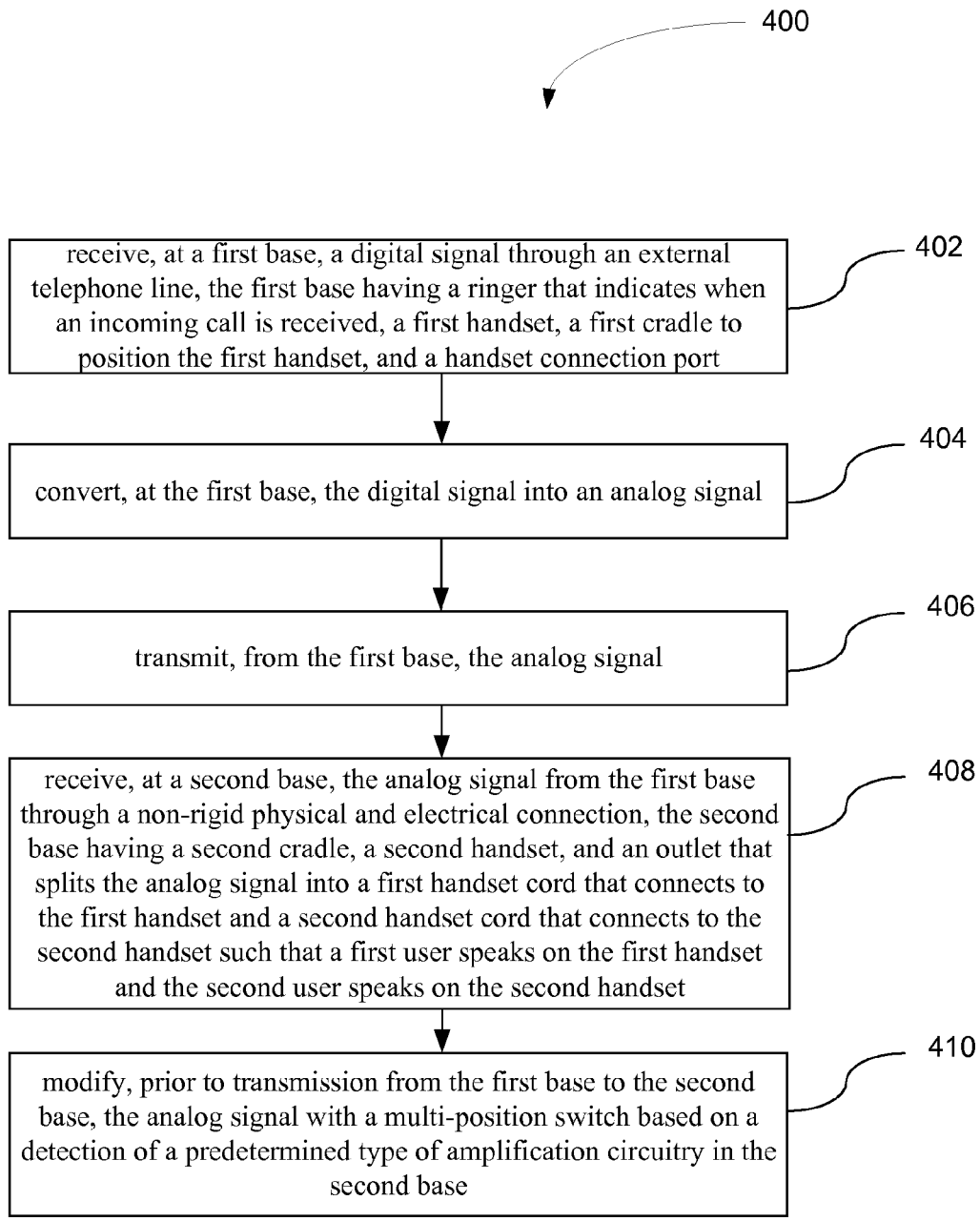
FIG. 4 is a block diagram of the process of Implementing the invention.

Features of an embodiment are now discussed from an illustrative perspective.

A multi-handset telephone system permits at least two users to converse face-to face with a third party. A first base that includes circuitry for communicating with an external telephone line. The first unit has a ringer for signaling when an incoming call is received, a cradle for holding a single handset, a first handset, and a handset connection port.

There is a second base with a cradle and a second handset. The second base is non-rigidly physically connected through a flexible wire to the fist base, and also electrically interconnected to the first base thought that wire. A port is provided for the first unit for communicating the signal from the incoming call. An outlet from the second unit splits the telephone signal from the line into a plurality of handset cords.

A first handset is connected with a first handset cord and a second handset is connected with a second handset cord. The plurality of handset cords permit a plurality of users in close proximity to speak on the plurality of handsets in a face-to-face situation with a third party.

The interconnection is a flexible hardwired connection, and there are one or more switches associated with the telephones.

Persons speaking different languages communicate face-to-face through use of remote interpretation services.

A multi-handset telephone system 10 has a primary telephone 11 which includes a base 12. The primary telephone 11 includes a numerical pad 13 for dialing telephone numbers, other multiple control buttons 14, and a first cradle 23 for providing a resting place for a first handset.

The base 12 of primary telephone 11 includes a first jack 24 for connection to an external telephone line 25 and plug 25a and includes a second jack 26 for connection to a handset line.

Circuitry generally designated at 27 connect first and second jacks 24 and 26 and provides electrical communication between jacks 24 and 26. A ringer 28 is operatively connected to the circuitry 27 for signaling when an incoming call is received on the external telephone line 25. A switch generally designated at 29 is provided on the first cradle 23 for selectively connecting or disconnecting second jack 26 with a signal carried by external telephone line 25. The switch takes the form of a hook switch 30. The primary telephone 11 is a digital telephone 11.

A secondary base 31 is connected to the primary base 12. The secondary base 31 includes a second cradle 32 for receiving a handset. Secondary base 31 is connected to primary base 12 by a flexible wire 35e.

Wiring generally designated at 34 are disposed in secondary base 31 for connecting second jack 26 to the handset cords of multiple handsets through wire 35e. The wiring 34 includes a wire 35 having a first end 35a connected to second jack 26 and second end 35b connected to a multi-port handset connector 36. The multi-port connector 36 acts as a splitting means for connecting wire 35 to two or more handset cords. The multi-port connector 36 includes port 36a for connection to wire 35 and ports 36b and 36c for connection to handset cords. The multi-port jack 36 may take the form of any splitter which provides a multiplicity of ports for connection to a multiplicity of handset cords.

The telephone 10 includes a first handset 37 which is positionable in the first cradle 23 and a second handset 38 which is positionable in the second cradle 32. The handsets 37 and 38 are unconnected, independently positionable, and may respectively rest within the respective cradles 23 and 32. A first handset cord 39 connects handset 39 multi-port connector 36, and a second handset cord 40 connects the handset 38 to multi-port connector 36. The handset cords 39 and 40 each include proximal plugs 39a and 40a and distal plugs 39b and 40b. The distal plugs 39b and 40b are plugged into ports 36b and 36c of multi-port connector 36.

Amplification and an external power source can be provided for powering, amplifying and controlling the sound levels of communications transmitted through handsets 37 and 38. The amplification and external power source input additional power into the system and reduce the amount of power which must be supplied by external line 25.

Multiple handsets and conventional telephone functions, may be used with telephone 10 without exceeding the power limit of the single telephone line. The amplification and external power source take the form of an amplifier 43 which is connected to a power cord 44 and plug 45. Plug 45 is pluggable into a standard electrical socket. The amplifier 43 divides line 35 into two segments and is connected to line 35 by jacks 43a and 43b and plugs 35c and 35d on line 35. The amplifier 42 amplifies and powers the signals traveling through line 35 to handsets 37 and 38 and reduce the power which would otherwise be drawn from external telephone line 25. The amplifier 42 and plug 45 can also be used to power two or more handsets so that any desired number of handsets can be used without taking power from external phone line 25. Amplifier 43 may also include a rotary volume control switch 43c for selectively adjusting the sound level of the communications transmitted through the headsets.

The telephone 10 includes only one circuitry 27, ringer 28, and switch 29 for forming an operable telephone. The handsets 37 and 38 are both connected to multi-port connector 36 so that both handsets 37 and 38 run off of the same circuitry, ringer and switch. The single hook switch 30 of the switch connects or disconnects the handsets 37 and 38 with a signal carried by external telephone line 25.

The telephone 10 may also include an auxiliary ringing means for signaling when an incoming call is received on external telephone line 25.

The telephone system permits an interpretation service for dialing to a language-specific translator. The telephone 10 allows a first person speaking one language to use handset 37 while another person speaking a different language uses handset 38. A procedure would be as follows. Lift handset 37 for dial tone. Optionally press Button 2 to mute the second handset. Press Button 1 on base 12 to speed dial (or alternatively dial as usual using the keypad of base 11). Remote interpretation service answers. Follow the language selection prompts-Interpreter is connected. Provide the handset 38 to the second person to converse.

The multi-handset telephone allows two or more people to talk on the same telephone line using multiple handsets.

There can be two buttons located on base 12. Button 1 would be a speed dial button generating tone signals going through the wire 35e and further through line 25 to the phone network. This provides for one touch dial access to the remote interpretation service after the primary handset 37 is lifted from the hook 30. The dialer is a programmable unit located inside the base 12. The dialer is powered by the battery. Button 2 is a mute button to cancel the interference from the ambient sound and noise picked up by the handset 38 when the handset 37 is in regular operation.

The phone base 12 generally uses analog (not a digital) signal between the handset and the main phone base 35e to allow the plurality of handset connections going through it. This allows operation regardless of the PBX brand, with a few exceptions. These would be where some digital phone systems have additional proprietary amplification circuitry built into their handsets, which modifies the analog signal accepted through 35e for normal operation. To address this, the invented phone base 12 has a multi-position switch to change the settings of the analog signal going over 35e. The various signal settings changed by the switch allow universal compatibility with digital phone systems.

In one embodiment, a process 400 is provided. At a process block 402, the process receives, at a first telephone base, a digital signal through an external telephone line. The first telephone base has a ringer that indicates when an incoming call is received, a first handset, a first cradle to position the first handset, and a handset connection port. Further, at a process block 404, the process 400 coverts, at the first telephone base, the digital signal into an analog signal. In addition, at a process block 406, the process transmits, from the first telephone base, the analog signal. At a process block 408, the process 400 receives, at a second telephone base, the analog signal from the first telephone base through a non-rigid physical and electrical connection. The second telephone base has a second cradle, a second handset, and an outlet that splits the analog signal into a first handset cord that connects to the first handset and a second handset cord that connects to the second handset such that a first user speaks on the first handset and the second user speaks on the second handset. Finally, at a process block 410, the process 400 modifies, prior to transmission from the first telephone base to the second telephone base, the analog signal with a multi-position switch based on a detection of a predetermined type of amplification circuitry in the second telephone base.

Figure 5:
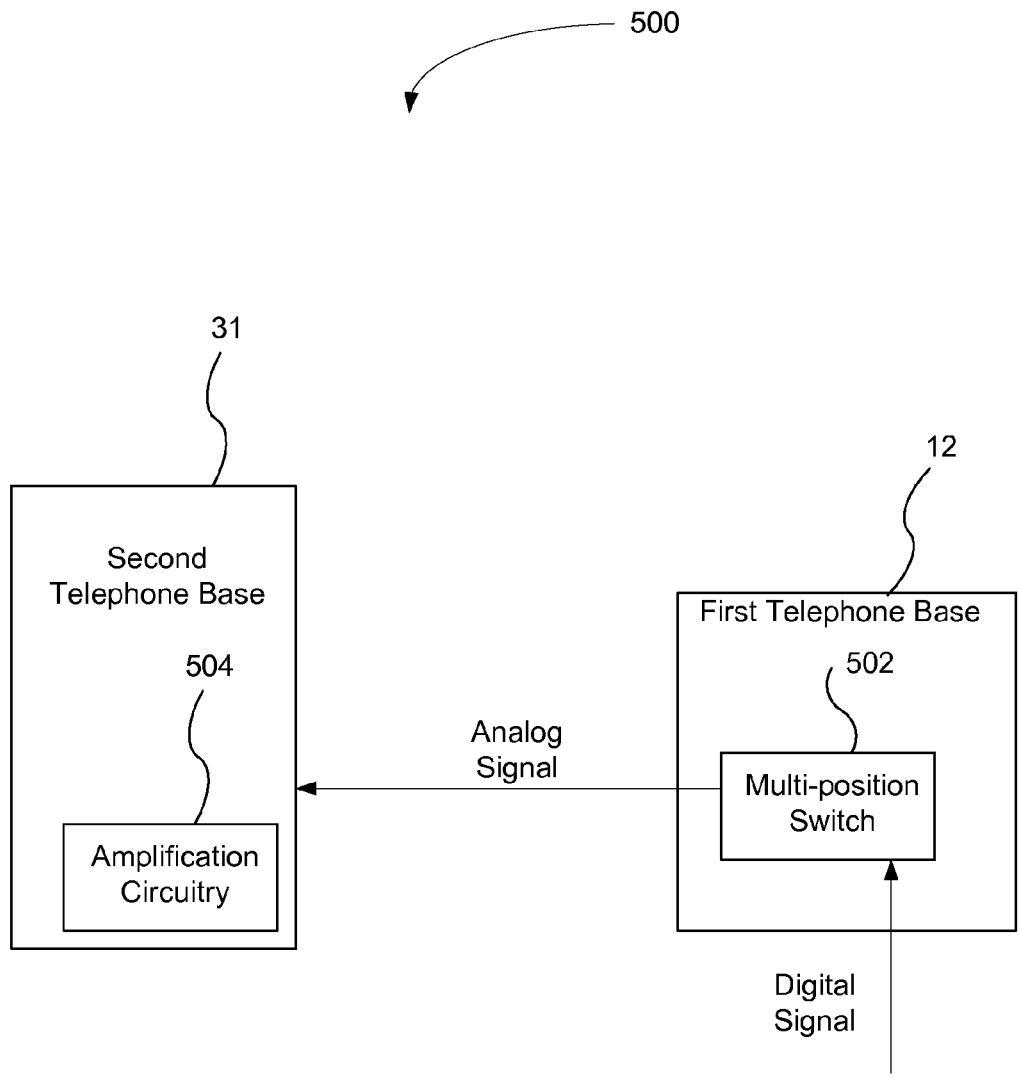
FIG. 5 is a detailed view of the connections between the multi handset system in accordance with the invention.

FIG. 5 illustrates a multi-handset telephone system 500. The first telephone base 12 receives a digital signal. A multi-position switch 502 receives the digital signal and modifies the digital signal to an analog signal prior to transmission from the first telephone base 12 to the second telephone base 31. The multi-position switch 502 makes the modification based on a predetermined type of amplification circuitry 504.

While embodiments of the invention have been disclosed in considerable detail in the foregoing for purposes of illustration, it will be understood that many of these details may be varied without departing from the spirit and scope of the invention.

Many other forms of the invention exist, each differing from the other in matters of detail only. For instance instead of a two part multi-handset phone there can be more than two handsets and respective components. Instead of use for interpretation services there can be other uses of the system. The system can be used for different teleconferencing communication needs.

It is to be understood that aspects of this invention could be used in other applications, such as for conference calling with multiple parties where it is desirable to use handsets. In some cases there can also be a speaker phone as part of the system, but this may not be desirable or available.

The invention should be determined by the following claims.

I claim:

1. A multi-handset telephone system for permitting at least two users to converse face-to face with a third party comprising:
    a first telephone base that receives a digital signal through an external telephone line, converts the digital signal into an analog signal, and transmits the analog signal, the first telephone base having a ringer that indicates when an incoming call is received, a first handset, a first cradle to position the first handset, and a handset connection port;
    a second telephone base that receives the analog signal from the first telephone base through a non-rigid physical and electrical connection, the second telephone base having a second cradle, a second handset, and an outlet that splits the analog signal into a first handset cord that connects to the first handset and a second handset cord that connects to the second handset such that a first user speaks on the first handset and the second user speaks on the second handset; and
    a multi-position switch configured to modify, prior to transmission from the first telephone base to the second telephone base, the analog signal based on a detection of a predetermined type of amplification circuitry in the second telephone base.

2. The multi-handset telephone system of claim 1 wherein the multi-position switch is operably connected to the first telephone base.

3. The multi-handset telephone system of claim 1 wherein the multi-position switch is operably connected to the second telephone base.

4. The multi-handset telephone system of claim 1 wherein the second telephone base does not have a ringer.

5. A method comprising:
    receiving, at a first telephone base, a digital signal through an external telephone line, the first telephone base having a ringer that indicates when an incoming call is received, a first handset, a first cradle to position the first handset, and a handset connection port;
    converting, at the first telephone base, the digital signal into an analog signal;
    transmitting, from the first telephone base, the analog signal;
    receiving, at a second telephone base, the analog signal from the first telephone base through a non-rigid physical and electrical connection, the second telephone base having a second cradle, a second handset, and an outlet that splits the analog signal into a first handset cord that connects to the first handset and a second handset cord that connects to the second handset such that a first user speaks on the first handset and the second user speaks on the second handset; and
    modifying, prior to transmission from the first telephone base to the second telephone base, the analog signal with a multi-position switch based on a detection of a predetermined type of amplification circuitry in the second telephone base.

6. The method of claim 5 wherein the multi-position switch is operably connected to the first telephone base.

7. The method of claim 5 wherein the multi-position switch is operably connected to the second telephone base.

8. The method of claim 5 wherein the second telephone base does not have a ringer.

* * * * *